Patented May 27, 1952

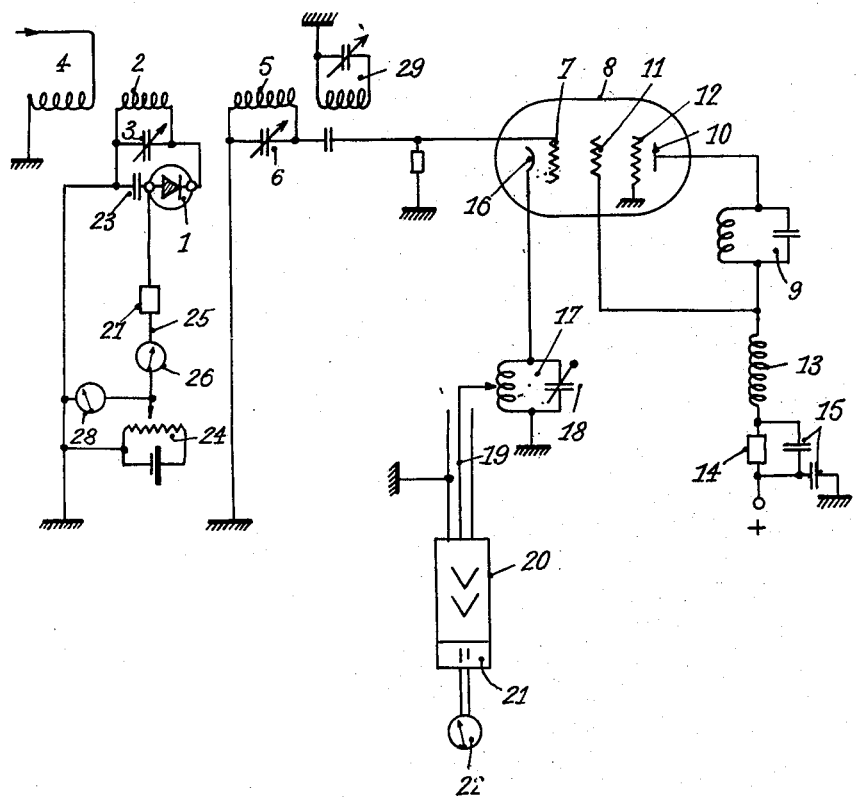

2,598,576

UNITED STATES PATENT OFFICE 2,598,576

CAPACITY-METER FOR MEASUREMENT OF LOW ELECTRIC CAPACITANCE VALUES

Herbert François Mataré, Vaucresson, Georges Calon, Villemomble, and Pierre Philippoteaux, Le Raincy, France, assignors to Societe Anonyme dite Compagnie Des Freins & Signaux Westinghouse, Paris, France Application January 19, 1950, Serial No. 139,432
In France January 29, 1949

4 Claims. (Cl. 175—183)

This invention relates to electric capacitance-measuring or indicating instruments, and more particularly to instruments for measuring low values of capacitance with high accuracy.

In the art of semi-conductive rectifiers, and also in other fields of electrical research, it is essential to be able to carry out capacitance measurements with great precision. Thus, it is desirable to measure very accurately the capacitance values of a semi-conductor because such a measurement provides very useful data as to the density $n_A$ of points of impurity or disturbance areas in the semi-conductor. The factor $n_A$ is connected with the capacitance of the arresting or boundary layer (cf. "Simplified and generalized theory of boundary-layer rectifiers," Vereinfachte u. erweiterte Theorie der Randschichtgleichrichtern, by W. Schottky, Ziet. f. Physik, vol. 118, p. 539, 1941–42), by the following relation:

$$\frac{d(1/C^2)}{dU} = \frac{8\pi}{\epsilon e} \cdot \frac{1}{n_A}$$

in which $\epsilon$=Dielectric constant or specific inductive capacity,
$U$=Voltage in volts,
$e$=Unitary charge,
$C$=Capacitance in farads.

It will thus be seen how important it is in such cases to be in a position to detect minute differences in capacitance between the points corresponding to different potentials of the "forward" and "reverse" characteristic curves which express the dissymmetry of a semi-conductor. In other words it is necessary to be able to measure capacity values in the order of 0.1 pf. (picofarads) when shunted by low resistances. Conventional capacity-meters do not allow of such precision measurement. Known capacity-meters generally use bridge-circuits (e. g. Wheatstone bridges and the like) which usually are only operable at comparatively low frequencies and thus do not allow any accurate capacitance measurement to be carried out under about 10 pf., especially where the capacitance is shunted by a very low resistance (in the order of a few hundredths of one ohm). Thus if it is desired to measure capacities lower than this order of magnitude, more complicated apparatus have to be employed, expensive to construct and delicate to operate.

It is an object of this invention to measure capacitance values in a range of magnitudes of about from 10 pf. to 0.01 pf. with increased precision.

It is an object to provide an improved capacity-meter having the above-specified indicating range which is simple of construction and the operation of which requires the adjustment of only one member to measure the capacitance of a given point of the characteristic curve, after the basic preliminary adjustments have been made.

It is also an object to provide an improved capacity-meter having the above-disclosed advantages which is particularly, though not exclusively, applicable to the measurement of very low capacities shunted by low resistances, as in semiconductor rectifiers, while capable at the same time of accurately measuring all forms of capacities, including pure capacitances.

Further objects and advantages of the invention will appear as the disclosure proceeds.

In attaining the objects of the invention an improved capacity-meter is provided which is characterised in that it comprises an input circuit, an indicating or measuring circuit which includes the capacity to be measured inserted therein, said indicating circuit being tuned to the frequency of said input circuit, a local oscillator and a mixer circuit for mixing the input frequency with the local oscillator frequency. The mixer circuit may comprise a pentode one section of which is operated as a local oscillator and the control grid circuit of which is coupled with the above-mentioned indicating circuit. According to the invention, a very high input frequency is used, in the order of 60 megacycles and the medium frequency obtained by mixing said input frequency with the local oscillator frequency is in the order of 20 mc. This mixed output is amplified and rectified so as to be representable by the deflection of a microammeter pointer.

The indicating or measuring circuit comprises a low-capacitance circuit which is tuned to the input frequency by means of a calibrated measuring element, and said circuit has the tested capacitance connected in parallel with it, said circuit having a very acute tuning characteristic, i. e. having a very high Q (resonance-voltage) factor. The local oscillator may be connected with the pentode in a circuit of the so-called "three-point" type. The control grid circuit of the mixer pentode is also coupled with an absorbing circuit adapted to prevent any voltage from the local oscillator from being applied to the capacity undergoing measurement.

A preferred embodiment of the invention will now be described for purposes of illustration and not of limitation with reference to the accompanying circuit diagram of a capacity-meter according to this invention.

As shown in the diagram, the capacity to be tested comprises a semi-conductor 1 and is mounted in parallel in a low-capacitance indicating or measuring circuit which includes an inductor 2 and a variable capacitor 3 which may preferably be provided with de-multiplying adjusting means in a ratio of e. g. 2/1000 and is initially calibrated against a standard capacity. The measuring circuit is coupled on one side with an input circuit 4 having a high frequency in the order of say 60 mc., and on the other side, through an inductor 5 and a variable condenser 6, with the control grid circuit 7 of a mixer pentode 8 in which the portion beyond the grid 7 operates as a local oscillator.

As shown in the diagram, the local oscillator circuit 9 is connected with the plate 10 and with the screen-grid 11 and the arresting grid 12 of the pentode in a circuit of the so-called "three-point" type, with an inductor 13 interposed between the common junction point and earth, together with the usual resistance 14 and condensers 15.

The cathode 16 of the pentode is connected with a medium frequency circuit 17 including an adjustable condenser 18 which may once for all be adjusted to a desired medium-frequency passband, the medium-frequency output being applied through a shielded conductor 19 to an amplifier 20 (such as a three-stage amplifier) illustrated in a schematical manner in the diagram followed by a detector diode or element 21, the rectified output current from which is measured by a microammeter 22.

The semi-conductor or other element which is to be tested for capacitance is capacitatively coupled with earth through a condenser 23 so to enable the application to said semi-conductor of a bias voltage through a potentiometer 24. In the connection 25 from the potentiometer to the semi-conductor, there is interposed a milliammeter 26 and if necessary a filter 27. A voltmeter 28 is disposed in parallel between one section of the potentiometer and earth.

Finally an absorbing or buffer circuit 29 is coupled with the control grid circuit 7 of the pentode through the medium of an inductor 5 so as to prevent any charge from the local oscillator from being applied to the rectifier element 1 the capacity of which is being measured. In use the above-described capacity-meter is operated as follows:

The rectifier to be tested 1 is first placed into position, it having first been checked for proper operation. The apparatus is then connected up to apply voltage to the mixer pentode which has its local oscillator mounted in a "three-point circuit" as stated, and also to the medium frequency amplifier 20. The buffer circuit 29 is tuned to the local oscillator frequency, in order to bring the current rectified by the semi-conductor element 1 down to a minimum, as ascertained by the milliammeter 26. The high-frequency supply is then connected through the input circuit 4, and is so tuned by means of the condenser 6 that its mixing with the local oscillator frequency will supply a medium frequency output such that the micro-ammeter 22 indicates maximum deflection. The semi-conductor element 1 is then removed and the measuring circuit 2—3 is tuned to the same resonance value as the mixer circuit, in order to obtain maximum deflection of the microammeter 22, that is, to obtain the requisite reference point for the capacitance to be measured. The semi-conductor 1 is then put back in position, thus causing the measuring circuit 2—3 to be put out of tune by the capacitance of the element 1 now in parallel therewith, and the adjustment of potentiometer 24 is varied in order to attain any desired point of the characteristic of the semi-conductor rectifier 1. When the desired point of measurement has been reached, the measuring condenser 3 is adjusted until a tuned condition is reached as indicated by a maximum deflection of microammeter 22. Upon resonance thus having been restored, the capacitance value of the semi-conductor 1 for the point of the characteristic tested is read on the dial of the variable condenser 3 which, as already stated, was accurately calibrated beforehand.

It will be seen from the foregoing description that once the apparatus has been adjusted for predetermined high- and medium-frequency values and with the tested capacity 1 in position, all that has to be done to measure this capacity is to vary the adjustment of the condenser 3 and read the value of the tested capacitance on the dial of the condenser 3.

It will also appear that owing in particular to the use of the mixer-oscillator pentode 8 a very simple capacity-meter construction is achieved, and one which is extremely simple to operate.

A necessary and obvious precaution is that the terminals connecting the semi-conductor rectifier 1 should be so mounted that the capacitance of said terminals with respect to ground will be quite negligible as compared to the capacitance of the naked unconnected rectifier, as otherwise an erroneous measurement would of course be obtained. Suitable steps should accordingly be taken in mounting said terminals.

Some further advantages of the above-described capacity-meter may be stated as follows: The measuring circuit 2 has a very sharp resonance curve (i. e. high Q factor) which greatly facilitates the reading of the capacitance 3. The high input frequency used (in the order of 60 mc.) gives a very low initial capacitance (10 to 20 pf.) whence high accuracy is secured in the measurement of small capacitance variations. The sensitivity is such that the rectified current resulting from the high frequency voltage across the rectifier input will be extremely low, this feature being obtained owing to the principle of the mixing step.

No disturbance is caused by voltage from the local oscillator which is obviously higher in value than the signal voltage, as a result of the provision of the buffer circuit 29. Moreover, the circuit characteristics are such that modifications in the distributed capacitance, due for instance to the insertion of the rectifier into the circuit, are so low as to be negligible.

A further advantage of the device is that it enables measurement of the capacitance of the semi-conductor element 1 for any point along its characteristic, simply by adjusting the potentiometer 24.

While in the illustrated embodiment the capacitance to be tested was shown as a semi-conductor rectifier element 1, it will be obvious that the device permits of measuring any capacitance within the indicating range of the instrument, i. e. from about 10 pf. to about 0.01 pf., whether it be a pure capacitance or a capacitance shunted by a low resistance, as is the case for a semi-conductor for instance. In the latter instance, the sensitivity of the capacity meter according to the invention lies approximately within 3/100 of one picofarad.

It will be understood that in the event a pure capacitance is to be measured, the biassing means described in connection with the illustrated example become inoperative. In fact, this feature provides a way of ascertaining whether the capacitance tested is a truly pure capacity, as in that case no deflections will be observed in either of the instruments 26 and 28 upon varying the adjustment of the potentiometer 24. No limitation is to be put on the scope of invention otherwise than as defined by the ensuing claims.

What we claim is:

1. Capacity-meter of the type described which comprises in combination a measuring circuit comprising a parallel combination of an inductance with a calibrated variable capacitor, a high-frequency input circuit means including an inductance coupled with said measuring circuit inductance, means for inserting a capacitance to be measured in parallel with said measuring circuit, a potentiometrically-adjustable voltage supply circuit for applying an adjustable biassing voltage to said capacitance, a mixer pentode, an oscillator circuit adapted to supply another and lower frequency and including a parallel inductance-capacitance combination connected across the screen-grid and the plate of said pentode, the arrestor grid of said pentode grounded, and the screen grid connected through an inductance- and capacitance combination to ground to provide a three-point circuit with said oscillator, a parallel variable-capacitance-and-inductance combination connected with the control grid of said pentode said last-mentioned inductance coupled with said measuring circuit inductance, a buffer circuit including a grounded parallel adjustable-capacitor-and-inductor combination coupled with said control-grid inductor, and an output circuit for said pentode extending from the cathode thereof and comprising an adjustable oscillatory circuit, amplifier means for the output therefrom, rectifier means for rectifying said amplified output, and a microammeter for indicating said amplified rectifier output.

2. Capacity-meter for the measurement of low capacitance values which comprises in combination means supplying a high frequency input, a measuring oscillatory circuit inductively coupled with said high frequency input and including an adjustable tuning element therein and means for inserting a capacitance to be measured into said circuit, a local oscillator circuit adapted to supply another and substantially lower frequency, a multi-electrode mixer tube, inductive coupling means applying the high frequency output from said measuring circuit to one section of said tube and means applying the lower frequency output from said oscillator circuit to another section of said tube, output means from said mixer tube for deriving a mixed product output therefrom, means for amplifying, rectifying and indicating said mixed product output, and a grounded buffer oscillatory circuit inductively coupled with said one tube section for preventing voltage from said oscillator circuit from being applied to said capacitance to be measured.

3. A capacity-meter as defined in claim 2, wherein said mixer tube is a pentode, the output from said measuring circuit is applied to the control grid of said pentode, and the output from said oscillator circuit is applied across the plate and the screen and arrestor-grids of said pentode in a three-point circuit.

4. Capacity-meter as in claim 3 wherein the mixed output from said tube is taken from the cathode of said pentode and comprises an adjustable tuning circuit therein between said cathode and said amplifying means.

HERBERT FRANÇOIS MATARÉ.
GEORGES CALON.
PIERRE PHILIPPOTEAUX.

REFERENCES CITED

The following references are of record in the file of this patent:

Hund, High-Frequency Measurements, 1st Ed., McGraw-Hill Book Co., New York, 1933, pages 229, 230.

Article by Bradshaw in Journal of Scientific Instruments, June 1945, pages 112–114.